United States Patent

[11] 3,532,128

[72] Inventors James E. Webb,
Administrator of the National Aeronautics and Space Administration with respect to an invention of;
Louis A. Rosales, Manhattan Beach;
John A. Fitton, Jr, Santa Monica, California
[21] Appl. No. 698,592
[22] Filed Jan. 17, 1968
[45] Patented Oct. 6, 1970

[54] MULTIPLE ORIFICE THROTTLE VALVE
9 Claims, 5 Drawing Figs.
[52] U.S. Cl.................................................. 138/45,
138/4, 251/118, 251/121
[51] Int. Cl.................................................. F15d 1/02
[50] Field of Search.......................................... 138/45, 46,
39, 43, 44, 30; 251/5, 118, 120—121; 92/90;
121/59

[56] References Cited
UNITED STATES PATENTS
2,091,051  8/1937  Mesinger................. 251/118X
2,114,139  4/1938  Crostwait, Jr. et al...... 251/121X
2,847,035  8/1958  Peters..................... 138/30
3,038,553  6/1962  Peters..................... 138/30X Primary Examiner—Laverne D. Geiger
Assistant Examiner—Henry K. Artis
Attorneys—G. T. McCoy, J. H. Warden and Howard B. Scheckman ABSTRACT: A throttle valve comprising a series of spaced plates having aligned orifices and including short bellows connecting adjacent plates, the plates being movable together to enable large fluid flow therethrough and movable apart to provide separated orifices that restrict the flow of fluid.

Patented Oct. 6, 1970
3,532,128
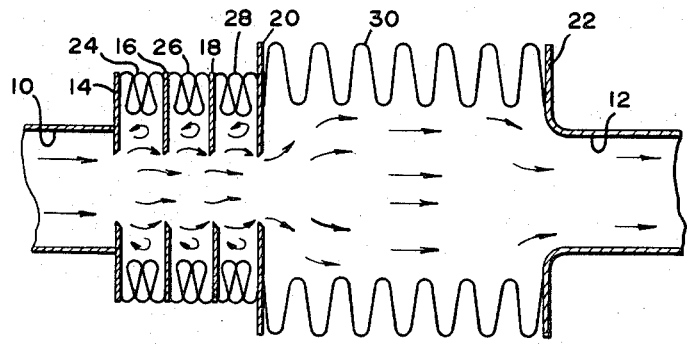
FIG.1
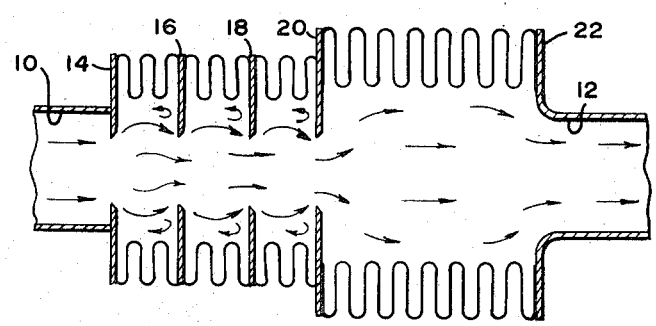
FIG.2
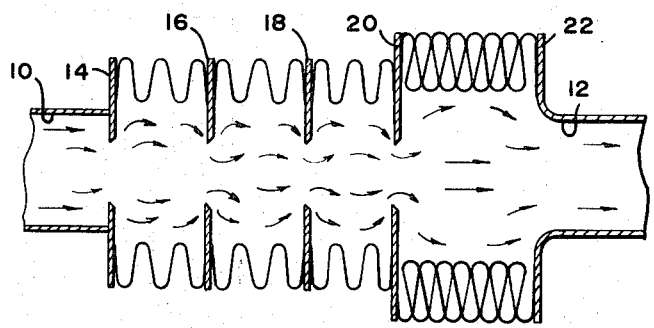
FIG.3
FIG.5
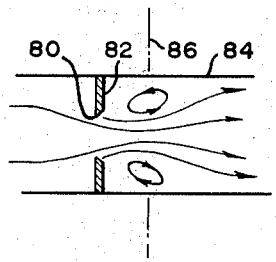
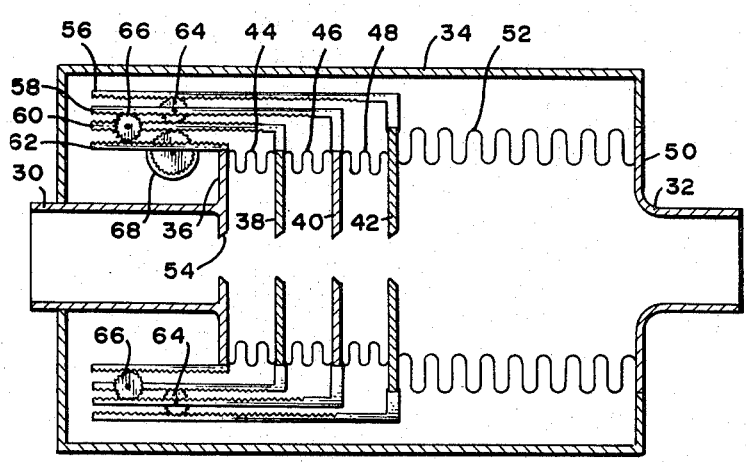
FIG.4
LOUIS A. ROSALES
JOHN A. FITTON, JR.
    INVENTORS
BY *J. Hms Coy*
*Howard B. Scheckman*
    ATTORNEYS

MULTIPLE ORIFICE THROTTLE VALVE

ORIGIN OF INVENTION

The invention described herein was made in the performance of work under a NASA contract and is subject to the provisions of Section 305 of the National Aeronautics and Space Act of 1958, Public Law 85—568 (72 Stat. 435; 42 USC 2457).

BACKGROUND OF THE INVENTION

This invention relates to throttle valves, and more particularly, to a novel throttle valve utilizing multiple orifices.

The regulation of fluid flow can be performed by a wide variety of throttle valves, including types which utilize gates that slide over an orifice to limit its area and types employing telescoping tubes for regulating the length of a narrow diameter pipe through which the fluid must flow. Throttle valves generally available employ relative moving parts such as those that slide or rotate. Such valves utilize seals to contain the fluid, the seals generally being of organic materials because it is difficult to find inorganic materials having proper sealing characteristics.

In certain applications, it is necessary to provide pipeline components having no exposed relative moving parts or organic seals which come in contact with the fluid. The pipelines of rocket engines for spacecraft constitute one such application. The pipelines of such rocket engines are exposed to a vacuum environment when the engine is not operating. In a vacuum environment sliding or rotating parts may experience cold welding problems which cause them to sieze, and such relatively moving parts are therefore undesirable. Furthermore, such rocket engines often use high energy propellents which corrode organic materials which might be used in seals, and therefore designs which require seals are undesirable. Thus, a throttle valve having no cold-weldable moving parts or seals in contact with the throttled fluid would be of substantial utility.

OBJECTS AND SUMMARY OF THE INVENTION

Accordingly, one object of the invention is to provide a throttle valve which is less subject to cold welding than prior art types.

Another object of the invention is to provide a throttle valve which is less subject to leakage than prior art types.

The present invention provides an improved throttle valve utilizing a series of plates with orifices and a series of bellows connecting the plates to enable variation in the distance from one orifice to the next. When the orifices are moved close together, they act as a single orifice and provide only limited restriction to fluid flow therethrough. On the other hand, when the orifices are spaced far apart, each orifice separately restricts fluid flow, and the entire series of orifices greatly limits the flow. At intermediate separations, fluid flow is throttled to a limited extent. The amount of throttling is easily controlled by controlling the separations. The use of bellows between the orifice plates results in the elimination of sliding or rotating parts and the need for dynamic seals. The mechanism for moving the plates may be positioned outside of the bellows, and therefore, need not come in contact with the fluid.

In one embodiment of the invention, a throttle valve for use in a pipeline is constructed so that there is a constant length between opposite ends of the valve. This valve employs a series of small bellows-connected orifice plates at one end. A large diameter opening is provided at the other end, and the connection between the large opening and the orifice plate nearest thereto is by means of a large bellows. Accordingly, when the series of small orifices are moved apart, the increase in distance between the first and last of the small orifices is taken up by the decrease in length between the last orifice and the large diameter opening at the other end of the valve. The decrease in length between the last orifice plate and the large opening does not substantially affect fluid flow, and therefore does not substantially offset the greater throttling due to increased separation of the small orifices.

The invention will best be understood from the following description when read in conjunction with the accompanying drawings.

DESCRIPTION OF THE DRAWINGS

FIG. 1 is a simplified sectional diagram of a valve constructed in accordance with the invention, showing the fluid flow therethrough in a minimum throttling position;

FIG. 2 is a simplified sectional view of the valve of FIG. 1 shown in an intermediate position for partial throttling of fluid flow therethrough;

FIG. 3 is a simplified sectional view of the valve of FIG. 1, in an extended position for maximum throttling and minimum flow of fluid therethrough;

FIG. 4 is a sectional view of a valve constructed in accordance with the invention; and FIG. 5 is a representational view of lines of fluid flow through an orifice.

DESCRIPTION OF THE PREFERRED EMBODIMENT

FIG. 1 illustrates a throttle valve for limiting the flow of fluid between an intake 10 and an outlet 12 which are connected in series with a pipeline. The valve comprises four (or more) orifice plates 14, 16, 18 and 20 aligned with each other and an outlet plate 22, disposed along the length of the valve. Four bellows 24, 26, 28, and 30 connect the five plates together. A first or inlet orifice plate 14 is fixed to the inlet 10, and the distance between it and the outlet plate 22 is constant for all positions of the valve. Throttling is accomplished by movement of the three intermediate orifice plates 16, 18 and 20.

In the throttle valve of FIG. 1, the throttling or limiting of fluid flow is accomplished primarily by the four small orifice plates 14, 16, 18 and 20, and in an amount determined by the distances between them. The distance between the last orifice plate 20 and the outlet plate 22 is utilized primarily to permit an increase between the small orifice plates without changing the total length of the valve in the pipeline. Accordingly, the bellows 30 is provided with a large diameter, as compared with the diameters of the other bellows, so that the fluid passing through the large bellows and the outlet 12 does not undergo substantial restriction in flow.

The four bellows, as well as the orifice plates of the throttle valve of FIG. 1 can all be constructed of metal, so that no organic materials need come in contact with the fluid passing through the valve. The bellows-type movement does not require the sliding or rotating of one part on another. Further, the seal between the inside and outside of a valve can be easily made reliable to prevent leaks over long periods of time. As one example, intake 10 and outlet 12 can be welded to their respective pipes to provide a permanent connection. Thus, if the valve is used in a vacuum environment whereby the inside of a valve is in a vacuum for long periods of time, mechanisms surrounding the valve can be easily maintained in an hermetically sealed environment. Yet the valve can carry liquids such as propellant oxidizers which corrode most organic materials.

The valve shown in FIG. 1 is in a collapsed position which permits maximum flow of fluid therethrough. FIG. 2 shows the valve of FIG. 1 in an intermediate position for enabling moderate flow of fluid therethrough, and FIG. 3 shows the valve in an extended position for maximum throttling and minimum fluid flow.

It can be seen that throttling is accomplished by increasing the spaces or separation distances between the orifice plates 14, 16, 18, and 20 by extending the bellows connecting them. The increased distance between the orifice plates is taken up by means of collapse of the large bellows 30.

The metering or throttling action of the valve is due to the fact that fluid flowing through an orifice creates a narrow or constricted section of flow downstream from the orifice. FIG.

5 shows the flow lines of a fluid passing through a sharp orifice 80 in a plate 82 located in a pipeline 84. At certain areas downstream from the orifice, such as the area at the plane 86, the flow is even more constricted than at the orifice. Such areas of constricted flow are generally referred to as the vena contracta.

If a group of widely spaced orifices is utilized in a pipeline, there exists a fully constricted flow area downstream from each orifice, and each orifice and its constricted downstream area act like an appreciable length of small diameter pipe that impedes fluid flow. The total effect of all of the widely spaced orifices is similar to the effect of a long length of small diameter pipe which greatly impedes fluid flow. However, if the orifices are closely spaced together, the total length along the pipeline which is constricted is limited to the distance between the orifices plus the length of constricted flow downstream from the last orifice. Thus, if a group of orifices is closely spaced, the ability of each orifice to restrict fluid flow along a length of pipe downstream from the orifice is not fully employed and the restricting effect is more limited than if the orifices are widely spaced.

The variation of throttling effect with distances between the orifice plates is the effect which enables variation in throttling by the throttle valve of the invention. In the configuration of FIG. 3 maximum throttling is achieved by almost full utilization of the constricting effect of each orifice plate on fluid flow downstream from the orifice. In the configuration of FIG. 1 there is insufficient distance between adjacent orifices to fully utilize the ability of each orifice plate to constrict downstream flow so as to obtain maximum throttling, and the throttling effect is at a minimum.

FIG. 4 is a sectional view of a throttle valve comprising an inlet 30 and outlet 32 for connection in series with a pipeline, and a housing 34 disposed about the valve to provide a sealed environment for the mechanisms therein. The valve has four orifice plates 36, 38, 40 and 42, connected by bellows, 44, 46, and 48. The valve also includes an outlet plate 50, mounted on the outlet 32 and connected to the last orifice plate 42 by a large bellows 52. Each orifice plate such as plate 36 has a sharp-edged orifice 54 for restricting the flow of fluid therethrough. A mechanism is included within the housing for moving the three orifice plates 38, 40 and 42. The mechanism includes four racks 56, 58, 60, and 62, connected together by pinions 64 and 66 and driven by a motor 68. The rack 62 is stationary, while the other racks move so as to maintain the same separation between any two adjacent orifice plates. The motor 68 drives the rack 60 to move the orifice plate 38 a controlled amount. Pinion 66 which is pivotally mounted on rack 60, drives rack 58 by twice the amount of its movement, while pinion 64, which is pivotally mounted on rack 58, drives rack 56 by three times the amount of movement of rack 60. The entire area between the outside of the bellows and the housing 34 can be hermetically sealed. This assures reliable operation of the moving means comprising the racks, pinions and motor by maintaining them in a pressurized environment, even though the environment outside of the housing is a vacuum.

The relative movement of the movable orifices is generally such that the distance between any adjacent orifices is the same. This enables maximum utilization of each orifice. However, in some applications it may be desirable to use a series of throttling orifices of different diameters, mechanisms that move the orifices so as to provide different separations between them, or different types of orifices such as rounded or Borda types. Two or more orifices can be utilized, so long as their separations can be adjusted so that, in a minimum throttling position, the distance of the downstream orifice from the upstream orifice is sufficiently small that it lies at an area wherein the fluid flow is still substantially constricted due to the action of the upstream orifice. This prevents the full utilization of the constricting effect of the upstream orifice.

Although particular embodiments of the invention have been described and illustrated herein, it is recognized that modifications and variations may readily occur to those skilled in the art and consequently it is intended that the scope of the appended claims cover such modifications and equivalents.

We claim:
1. A throttle valve for controlling fluid flow comprising:
 means defining an intake of first predetermined diameter;
 means defining an outlet of second predetermined diameter;
 first orifice means for constricting fluid flow therethrough, said first orifice means located between said intake and outlet and having a smaller diameter than said intake;
 second orifice means located downstream from said first orifice means for constricting fluid flow therethrough; and
 moving means for varying the separation of said orifice means between a first separation distance, wherein said second orifice means lies within an area of constricted flow caused by said first orifice means, and a second separation distance greater than said first separation distance.

2. A throttle valve as defined in claim 1 wherein:
 said moving means is constructed to hold said orifice means at either of said separations independently of the pressure of said fluid.

3. A throttle valve as defined in claim 1 wherein:
 said outlet is disposed downstream from said first orifice by a predetermined distance greater than said second separation distance, and said outlet has an opening which is larger than the opening of either of said orifices.

4. A throttle valve as defined in claim 1 wherein:
 said second orifice means comprises a plurality of plates, each having an orifice in it; and including
 means for varying the separation of said plurality of plates of said second orifice means.

5. A throttle valve comprising:
 a plurality of orifice plate means aligned with each other for enabling the consecutive passage of fluid through them;
 moving means connected to said plurality of orifice plate means for holding them at a plurality of relative separations substantially independently of the pressure of fluid flowing through said orifice plate means; and
 bellows means connecting adjacent of said orifice plate means for sealing the area between them.

6. A throttle valve as defined in claim 5 including:
 outlet means having an opening with a cross section greater than the orifice cross section of any of said plurality of orifice plate means; and
 bellows means connecting one of said plurality of orifice plate means closest to said outlet means and said outlet means.

7. A throttle valve as defined in claim 5 including:
 means defining an inlet; and wherein said plurality of orifice plate means comprises at least three separate plates having orifices of approximately the same diameter, the diameter of said orifices being smaller than the diameter of said inlet; and
 said moving means comprises means for moving at least two of said orifice means so that the separation between adjacent orifices is equal.

8. A multiple orifice throttle valve comprising:
 inlet orifice means for connection to a pipeline;
 outlet means positioned a predetermined distance from said inlet orifice means, for connection to a pipeline;
 intermediate orifice means positioned between said inlet orifice means and said outlet means;
 first bellows means connecting said inlet orifice means to said intermediate orifice means;
 second bellows means connecting said outlet means to said intermediate orifice means; and
 moving means for holding said inlet orifice means at variable distances from said intermediate orifice means, independent of the pressure of fluid flowing therethrough, including means for altering the position of said intermediate orifice means between a first position wherein it lies near the vena contracta formed downstream of said inlet orifice means for a given fluid flow through said throttle valve and a second position of said intermediate orifice means spaced downstream from said first positon.

9. A throttle valve as defined in claim 8 wherein:

said intermediate orifice means comprises a plurality of spaced orifice plates; and said moving means includes means for varying the separation of said plurality of spaced orifice plates.